(12) United States Patent
Richards

(10) Patent No.: US 8,376,366 B2
(45) Date of Patent: Feb. 19, 2013

(54) SEALING GLAND AND METHODS OF USE

(75) Inventor: Ed Richards, Warwickshire (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 766 days.

(21) Appl. No.: 12/328,237

(22) Filed: Dec. 4, 2008

(65) Prior Publication Data
US 2010/0140876 A1 Jun. 10, 2010

(51) Int. Cl.
E21B 33/10 (2006.01)
F16J 15/40 (2006.01)

(52) U.S. Cl. ......... 277/336; 277/431; 277/432; 277/512

(58) Field of Classification Search .......... 277/431–432, 277/500, 512, 510, 336–337
See application file for complete search history.

(56) References Cited

U.S. PATENT DOCUMENTS

| 3,334,906 | A | | 8/1967 | Arnold | |
| 3,926,442 | A | * | 12/1975 | Muller | 277/348 |
| 4,146,238 | A | * | 3/1979 | Gaffal | 277/411 |
| 4,428,584 | A | * | 1/1984 | Shapiro | 277/351 |
| 4,505,115 | A | * | 3/1985 | Arbuckle | 60/562 |
| 5,113,953 | A | | 5/1992 | Noble et al. | |
| 5,209,495 | A | * | 5/1993 | Palmour | 277/500 |
| 5,265,682 | A | | 11/1993 | Russell et al. | |
| 5,520,255 | A | | 5/1996 | Barr et al. | |
| 5,553,678 | A | | 9/1996 | Barr et al. | |
| 5,553,679 | A | | 9/1996 | Thorp et al. | |
| 5,582,259 | A | | 12/1996 | Barr et al. | |
| 5,603,385 | A | | 2/1997 | Colebrook et al. | |
| 5,673,763 | A | | 10/1997 | Thorp et al. | |
| 5,685,379 | A | | 11/1997 | Barr et al. | |
| 5,695,015 | A | | 12/1997 | Barr et al. | |
| 5,706,905 | A | | 1/1998 | Barr et al. | |
| 5,746,435 | A | * | 5/1998 | Arbuckle | 277/304 |
| 5,772,216 | A | * | 6/1998 | Bredemeyer | 277/318 |
| 5,778,992 | A | | 7/1998 | Fuller et al. | |
| 5,803,185 | A | | 9/1998 | Barr et al. | |
| 5,971,085 | A | | 10/1999 | Colebrook et al. | |

(Continued)

FOREIGN PATENT DOCUMENTS

EP 1965108 10/2011
GB 2213539 8/1989

(Continued)

OTHER PUBLICATIONS

Parmley, Robert O., "Machine Devices & Components Illustrated Sourcebook" 16-12-16-13 (2005).

(Continued)

Primary Examiner — Vishal Patel
(74) Attorney, Agent, or Firm — Chadwick Sullivan

(57) ABSTRACT

The invention provides a sealing gland capable of use in high-pressure environments and methods for the use thereof. One aspect of the invention provides a sealing gland including: a first sealing surface having a first groove and a second groove, a first O-ring received in the first groove, a second O-ring received in the second groove, and a pressure port located on the first sealing surface between the first groove and the second groove. The pressure port is configured to apply a fluid pressure intermediate to a first pressure applied to the first O-ring and a second pressure applied to the second O-ring.

13 Claims, 4 Drawing Sheets

U.S. PATENT DOCUMENTS

| | | | |
|---|---|---|---|
| 6,089,332 | A | 7/2000 | Barr et al. |
| 6,092,610 | A | 7/2000 | Kosmala et al. |
| 6,158,529 | A | 12/2000 | Dorel |
| 6,244,361 | B1 | 6/2001 | Comeau et al. |
| 6,364,034 | B1 | 4/2002 | Schoeffler |
| 6,394,193 | B1 | 5/2002 | Askew |
| 7,118,114 | B2 * | 10/2006 | Burdick et al. ............... 277/510 |
| 7,201,379 | B2 * | 4/2007 | Lemetteil ...................... 277/411 |
| 7,884,395 | B2 * | 2/2011 | Saito ............................ 257/199 |
| 2001/0052428 | A1 | 12/2001 | Larronde et al. |
| 2002/0011359 | A1 | 1/2002 | Webb et al. |

FOREIGN PATENT DOCUMENTS

| | | |
|---|---|---|
| GB | 2393766 | 4/2004 |

OTHER PUBLICATIONS

Dichtomatik O-Ring Handbook 12-22, 132-40 (Dan Visscher ed. 2008).

Schlumberger, "HPHT Drilling, Evaluation and Completion: The hot prize in the North Sea" (Jun. 2001).

International Search Report for the equivalent patent application No. PCT/GB09/002799 issued on Jul. 8, 2010.

* cited by examiner

SEALING GLAND AND METHODS OF USE

TECHNICAL FIELD

The invention provides a sealing gland capable of use in high-pressure environments and methods for the use thereof.

BACKGROUND

Oil, gas, and water drilling applications involve both the use of high-pressure fluids, such as mud, and exposure to high-pressure drilling environments. The latter is particularly true in high-pressure, high-temperature (HPHT) environments such as North Sea oil reservoirs. Accordingly, there is a need for sealing devices capable of withstanding high-pressure environments.

SUMMARY OF THE INVENTION

The invention provides a sealing gland capable of use in high-pressure environments and methods for the use thereof.

One aspect of the invention provides a sealing gland including: a first sealing surface having a first groove and a second groove, a first O-ring received in the first groove, a second O-ring received in the second groove, and a pressure port located on the first sealing surface between the first groove and the second groove. The pressure port is configured to apply a fluid pressure intermediate to a first pressure applied to the first O-ring and a second pressure applied to the second O-ring.

This aspect can have several embodiments. The sealing gland can include a second sealing surface configured to mate with the first sealing surface. The sealing gland can include a pressure reservoir in communication with the pressure port for holding a pressurized fluid. The sealing gland can include a fill port coupled with the pressure reservoir for adjusting the volume of the fluid in the pressure reservoir. The pressure reservoir can include a sealing piston and a compression member for permitting movement of the sealing piston to maintain a substantially constant fluid pressure in the pressure reservoir. The compression member can be a compression spring. The compression member can be a Belleville spring.

The fluid pressure can be liquid pressure. The fluid pressure can be gas pressure. The fluid pressure can approximate the arithmetic mean of the first pressure applied to the first O-ring and the second pressure applied to the second O-ring. Each of the O-rings can be subjected to a pressure drop of about 20 ksi.

The first O-ring can include a material selected from the group consisting of: acrylonitrile-butadiene rubber, hydrogenated acrylonitrile-butadiene rubber, fluorocarbon rubber, perfluoroelastomer, ethylene propylene diene rubber, silicone rubber, fluorosilicone rubber, chloroprene rubber, neoprene rubber, polyester urethane, polyether urethane, natural rubber, polyacrylate rubber, ethylene acrylic, styrene-butadiene rubber, ethylene oxide epichlorodrine rubber, chlorosulfonated polyethylene, butadiene rubber, isoprene rubber, and butyl rubber.

The second O-ring can include a material selected from the group consisting of: acrylonitrile-butadiene rubber, hydrogenated acrylonitrile-butadiene rubber, fluorocarbon rubber, perfluoroelastomer, ethylene propylene diene rubber, silicone rubber, fluorosilicone rubber, chloroprene rubber, neoprene rubber, polyester urethane, polyether urethane, natural rubber, polyacrylate rubber, ethylene acrylic, styrene-butadiene rubber, ethylene oxide epichlorodrine rubber, chlorosulfonated polyethylene, butadiene rubber, isoprene rubber, and butyl rubber.

Another aspect of the invention provides a sealing gland including: a first sealing surface having n grooves, n O-rings, and n−1 pressure ports located on the first sealing surface between each of the n O-rings. Each of the n O-rings is received in one of the n grooves. Each of the n−1 pressure ports is configured to apply a fluid pressure P intermediate to pressures applied to the immediately adjacent O-rings. Parameter n is an integer greater or equal to 2.

This aspect can have several embodiments. Each of the n O-rings can be exposed to a pressure gradient between a first fluid pressure $P_{n-1}$ and a second fluid pressure $P_n$. Each of the pressure gradients can be substantially equal. Each of the pressure gradients can be less than specified maximum pressure differential for each the n O-rings. The sealing gland can include n−1 pressure reservoirs, each pressure reservoir in communication one of the n−1 pressure ports. The sealing gland can include: a single pressure reservoir, each pressure reservoir in communication with the n−1 pressure ports; and n−1 pressure regulator for regulating the pressure applied to the n−1 pressure ports.

Another embodiments of the invention provides a sealing method including: providing a first sealing surface including n grooves, n O-rings, and n−1 pressure ports located on the first sealing surface between each of the n O-rings; mating the first sealing surface with a second sealing surface; and applying a fluid pressure to each of the n−1 pressure ports. Each of the n O-rings is received in one of the n grooves. Each of the n−1 pressure ports is configured to apply a fluid pressure P intermediate to pressures applied to the immediately adjacent O-rings. Parameter n is an integer greater or equal to 2.

DESCRIPTION OF THE DRAWINGS

For a fuller understanding of the nature and desired objects of the present invention, reference is made to the following detailed description taken in conjunction with the accompanying drawing figures wherein like reference characters denote corresponding parts throughout the several views and wherein.

DETAILED DESCRIPTION OF THE INVENTION

The invention provides a sealing gland capable of use in high-pressure environments and methods for the use thereof. Some embodiments of the invention can be used in a wellsite system.

Wellsite System

Figure 1:
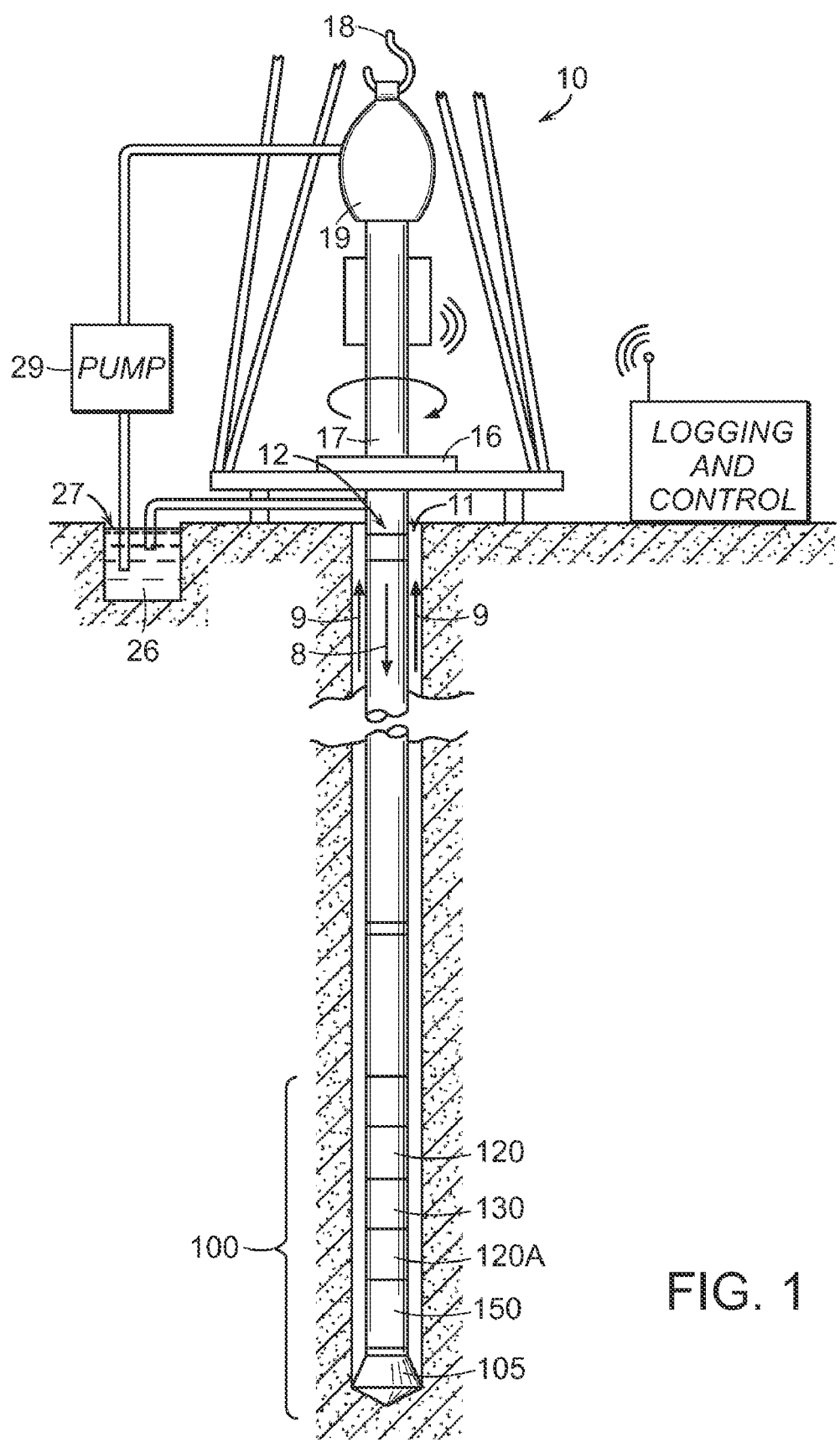
FIG. 1 illustrates a wellsite system in which the present invention can be employed.

FIG. 1 illustrates a wellsite system in which the present invention can be employed. The wellsite can be onshore or offshore. In this exemplary system, a borehole 11 is formed in subsurface formations by rotary drilling in a manner that is well known. Embodiments of the invention can also use directional drilling, as will be described hereinafter.

A drill string 12 is suspended within the borehole 11 and has a bottom hole assembly 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block (also not shown), through the kelly 17 and a rotary swivel 19 which permits rotation of the drill string relative to the hook. As is well known, a top drive system could alternatively be used.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrow 9. In this well known manner, the drilling fluid lubricates the drill bit 105 and carries formation cuttings up to the surface as it is returned to the pit 27 for recirculation.

The bottom hole assembly 100 of the illustrated embodiment includes a logging-while-drilling (LWD) module 120, a measuring-while-drilling (MWD) module 130, a roto-steerable system and motor, and drill bit 105.

The LWD module 120 is housed in a special type of drill collar, as is known in the art, and can contain one or a plurality of known types of logging tools. It will also be understood that more than one LWD and/or MWD module can be employed, e.g. as represented at 120A. (References, throughout, to a module at the position of 120 can alternatively mean a module at the position of 120A as well.) The LWD module includes capabilities for measuring, processing, and storing information, as well as for communicating with the surface equipment. In the present embodiment, the LWD module includes a pressure measuring device.

The MWD module 130 is also housed in a special type of drill collar, as is known in the art, and can contain one or more devices for measuring characteristics of the drill string and drill bit. The MWD tool further includes an apparatus (not shown) for generating electrical power to the downhole system. This may typically include a mud turbine generator (also known as a "mud motor") powered by the flow of the drilling fluid, it being understood that other power and/or battery systems may be employed. In the present embodiment, the MWD module includes one or more of the following types of measuring devices: a weight-on-bit measuring device, a torque measuring device, a vibration measuring device, a shock measuring device, a stick slip measuring device, a direction measuring device, and an inclination measuring device.

A particularly advantageous use of the system hereof is in conjunction with controlled steering or "directional drilling." In this embodiment, a roto-steerable subsystem 150 (FIG. 1) is provided. Directional drilling is the intentional deviation of the wellbore from the path it would naturally take. In other words, directional drilling is the steering of the drill string so that it travels in a desired direction.

Directional drilling is, for example, advantageous in offshore drilling because it enables many wells to be drilled from a single platform. Directional drilling also enables horizontal drilling through a reservoir. Horizontal drilling enables a longer length of the wellbore to traverse the reservoir, which increases the production rate from the well.

A directional drilling system may also be used in vertical drilling operation as well. Often the drill bit will veer off of an planned drilling trajectory because of the unpredictable nature of the formations being penetrated or the varying forces that the drill bit experiences. When such a deviation occurs, a directional drilling system may be used to put the drill bit back on course.

A known method of directional drilling includes the use of a rotary steerable system ("RSS"). In an RSS, the drill string is rotated from the surface, and downhole devices cause the drill bit to drill in the desired direction. Rotating the drill string greatly reduces the occurrences of the drill string getting hung up or stuck during drilling. Rotary steerable drilling systems for drilling deviated boreholes into the earth may be generally classified as either "point-the-bit" systems or "push-the-bit" systems.

In the point-the-bit system, the axis of rotation of the drill bit is deviated from the local axis of the bottom hole assembly in the general direction of the new hole. The hole is propagated in accordance with the customary three point geometry defined by upper and lower stabilizer touch points and the drill bit. The angle of deviation of the drill bit axis coupled with a finite distance between the drill bit and lower stabilizer results in the non-collinear condition required for a curve to be generated. There are many ways in which this may be achieved including a fixed bend at a point in the bottom hole assembly close to the lower stabilizer or a flexure of the drill bit drive shaft distributed between the upper and lower stabilizer. In its idealized form, the drill bit is not required to cut sideways because the bit axis is continually rotated in the direction of the curved hole. Examples of point-the-bit type rotary steerable systems, and how they operate are described in U.S. Patent Application Publication Nos. 2002/0011359; 2001/0052428 and U.S. Pat. Nos. 6,394,193; 6,364,034; 6,244,361; 6,158,529; 6,092,610; and 5,113,953.

In the push-the-bit rotary steerable system there is usually no specially identified mechanism to deviate the bit axis from the local bottom hole assembly axis; instead, the requisite non-collinear condition is achieved by causing either or both of the upper or lower stabilizers to apply an eccentric force or displacement in a direction that is preferentially orientated with respect to the direction of hole propagation. Again, there are many ways in which this may be achieved, including non-rotating (with respect to the hole) eccentric stabilizers (displacement based approaches) and eccentric actuators that apply force to the drill bit in the desired steering direction. Again, steering is achieved by creating non co-linearity between the drill bit and at least two other touch points. In its idealized form the drill bit is required to cut sideways in order to generate a curved hole. Examples of push-the-bit type rotary steerable systems, and how they operate are described in U.S. Pat. Nos. 5,265,682; 5,553,678; 5,803,185; 6,089,332; 5,695,015; 5,685,379; 5,706,905; 5,553,679; 5,673,763; 5,520,255; 5,603,385; 5,582,259; 5,778,992; and 5,971,085.

Sealing Glands

Figure 2A:
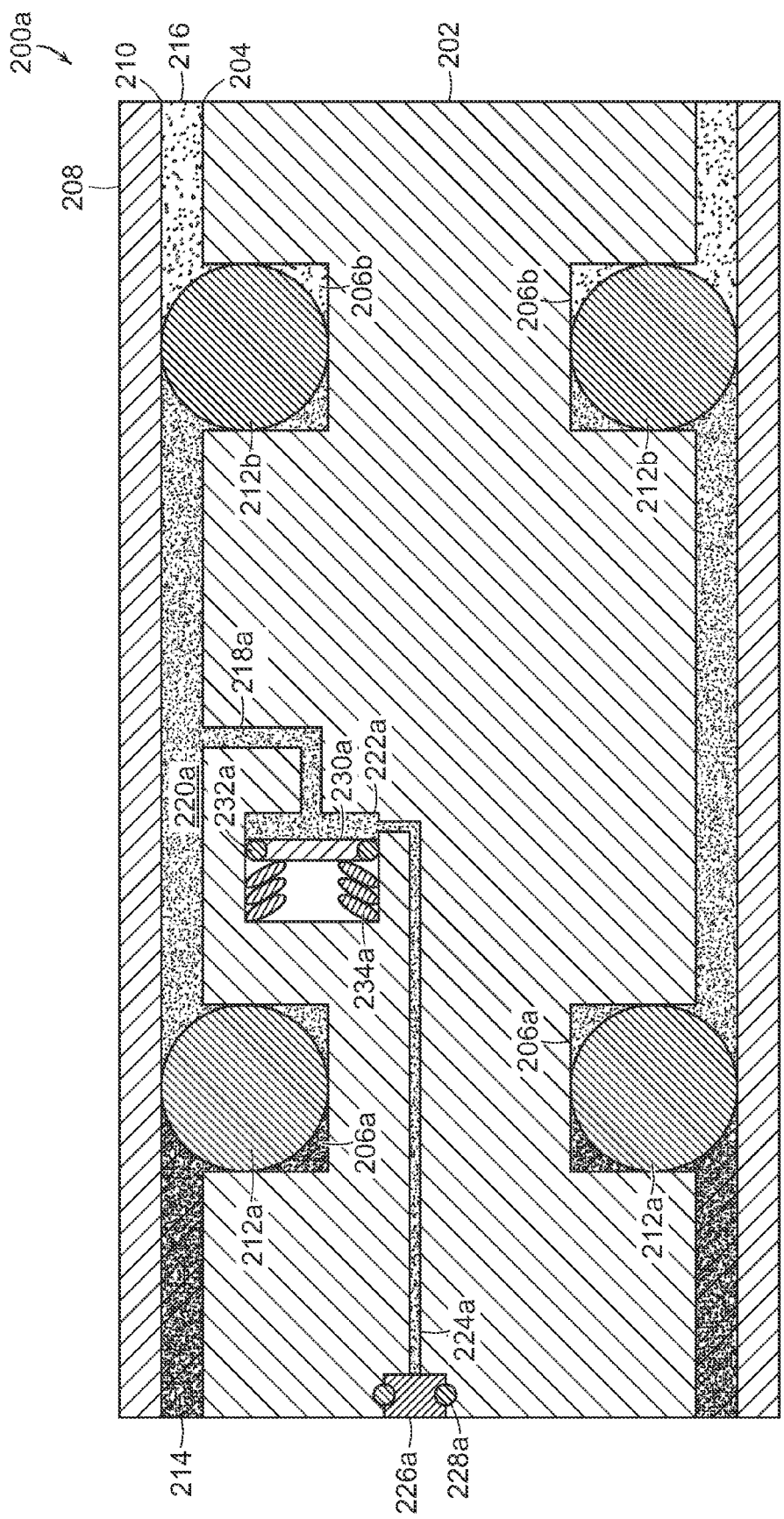
FIG. 2A illustrates a cross-section of a glandular seal according to one embodiment of the invention.

FIG. 2A depicts a cross-section of a glandular seal 200a according to one embodiment of the invention. A first sealing member 202 has a first sealing surface 204 with a first groove 206a and a second groove 206b. A second sealing member 208 has a second sealing surface 210. A first O-ring 212a is received within the first groove 206a and a second O-ring 212b is received within the second groove 206b.

Glandular seal 200a separates a high pressure region containing a fluid 214 (e.g. gas and/or liquid) from a low pressure region containing a fluid 216 (e.g. gas and/or liquid). A pressure port 218a is located on the first sealing surface 204 and is configured to apply a fluid pressure to the intermediate region 220a between first O-ring 212a and second O-ring 212b. This fluid pressure of intermediate region 220 can be less than the high pressure fluid 214 and greater than the lower pressure fluid 216. In some embodiments, the fluid pressure in intermediate region 220a can approximate the arithmetic mean of the high pressure fluid 214 and the lower pressure fluid 216. In such an embodiment, the fluid pressure in the intermediate region ($P_I$) can be defined by the following equation, where $P_H$ represents the pressure of high pressure fluid 214 and $P_L$ represents the pressure of low pressure fluid 216:

$$P_I \approx \frac{P_H + P_L}{2}.$$

By applying an intermediate fluid pressure to region 220a, the pressure differentials across the first O-ring 212a and second O-ring 212b is reduced. For example, if $P_H$=40 ksi, $P_I$=20 ksi, and $P_L$=0 ksi, the pressure differential across both O-rings 212a, 212b is 20 ksi. Lower pressure differentials result in lower incidences of O-ring failure. The glandular seal is ideally configured such that the pressure differential across any particular O-ring 212 is less than or equal to the maximum pressure differential that the O-ring 212 can withstand. This value can be published by the manufacturer of the O-ring 212, determined from a treatise, or determined by experimentation.

The fluid pressure in intermediate region 220a can be applied by a fluid such as a liquid or a gas. In some embodiments, the gas is an inert gas (e.g. nitrogen, helium, neon, argon, krypton, xenon, and/or radon). The liquid can be a polar or non-polar liquid (e.g. an oil). Ideally, the fluid is compatible with the O-rings. In such an embodiment, the fluid in intermediate region 220a acts to moisten and maintain the pliability of O-rings 212a and 212b.

The fluid pressure in region 220a can be provided by pressure reservoir 222. The contents of pressure reservoir 222, and thereby the fluid pressure in region 220a can be adjusted with fill port 224. Fill port 224 can include a cap 226, which can include one or more O-rings 228.

The pressure reservoir 222 can include a sealing piston 230 (which can include one or more O-rings 232) and a compression member 234. The compression member 234 permits movement of the sealing piston to maintain a substantially constant fluid pressure in the pressure reservoir 222.

The sealing piston can be any durable material capable of withstanding pressure and the selected pressurizing fluid. Suitable materials include metals, resins, and/or polymers.

In some embodiment, the compression member 234 can be a compression spring. In other embodiments, the compression member 234 can be a Belleville spring as depicted in FIG. 2A. A Belleville spring is comprised of one or more cupped spring washers known as Belleville washers. Although the Belleville spring in FIG. 2A is a single group of three Belleville washers in parallel, additional configurations are within the scope of the invention including multiple groups of one or more Belleville washers as depicted in Robert O. Parmley, *Machine Devices & Components Illustrated Sourcebook* 16-13 (2005).

The first and second O-rings 212a and 212b can be constructed of a variety of materials including nitrile butadiene rubber (NBR), acrylonitrile-butadiene rubber, hydrogenated acrylonitrile-butadiene rubber, fluorocarbon rubber, perfluoroelastomer, ethylene propylene diene rubber, silicone rubber, fluorosilicone rubber, chloroprene rubber, neoprene rubber, polyester urethane, polyether urethane, natural rubber, polyacrylate rubber, ethylene acrylic, styrene-butadiene rubber, ethylene oxide epichlorodrine rubber, chlorosulfonated polyethylene, butadiene rubber, isoprene rubber, butyl rubber, polytetrafluoroethylene (PTFE), polyamides (e.g. nylon) and the like.

Figure 2B:
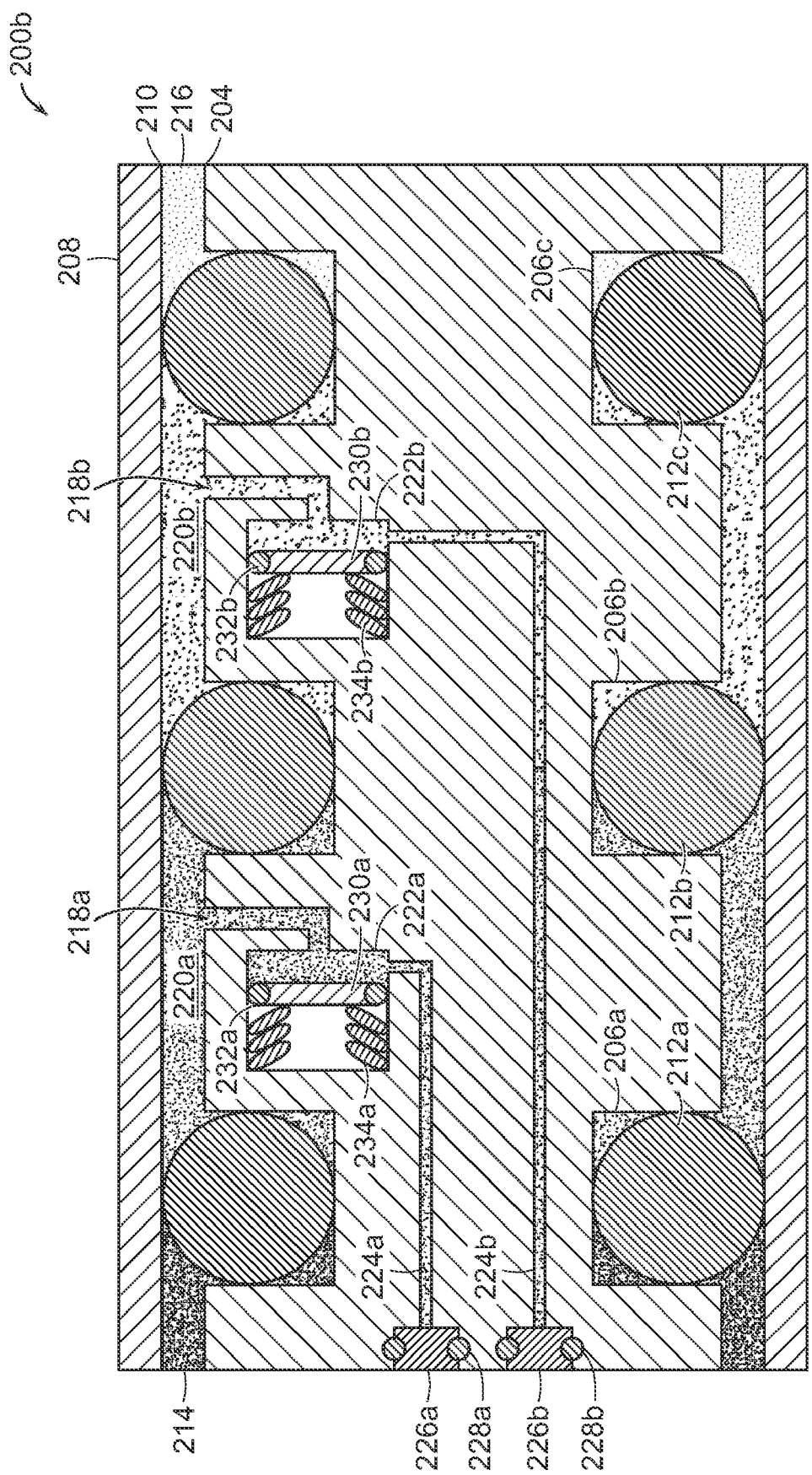
FIG. 2B illustrates a cross-section of a glandular seal with multiple pressure ports and multiple pressure reservoirs according to one embodiment of the invention.

Referring to FIG. 2B, another embodiment of the invention provides a glandular seal 200b having two more intermediate regions 220a, 220b and corresponding pressure ports 218a, 218b. The pressure in the intermediate regions 220a, 220b are regulated to further reduce the pressure differentials across O-rings 212a, 212b, 212c.

Stated more generally, a glandular seal can be provided which includes n O-rings that define n-1 intermediate regions. The pressure in each intermediate region is controlled to minimize the pressure differential across O-rings. For example, in a glandular seal where n=4, three intermediate regions are provided, which are pressurized to pressures $P_{I1}$, $P_{I2}$, and $P_{I3}$ respectively. If the first intermediate regions is adjacent to the high pressure region pressurized at pressure $P_H$, the intermediate pressures can be configured as follows:

$$P_H < P_{I1} < P_{I2} < P_{I3} < P_L.$$

In some embodiments, the pressure differential across multiple O-rings is equal or substantially equal.

Figure 2C:
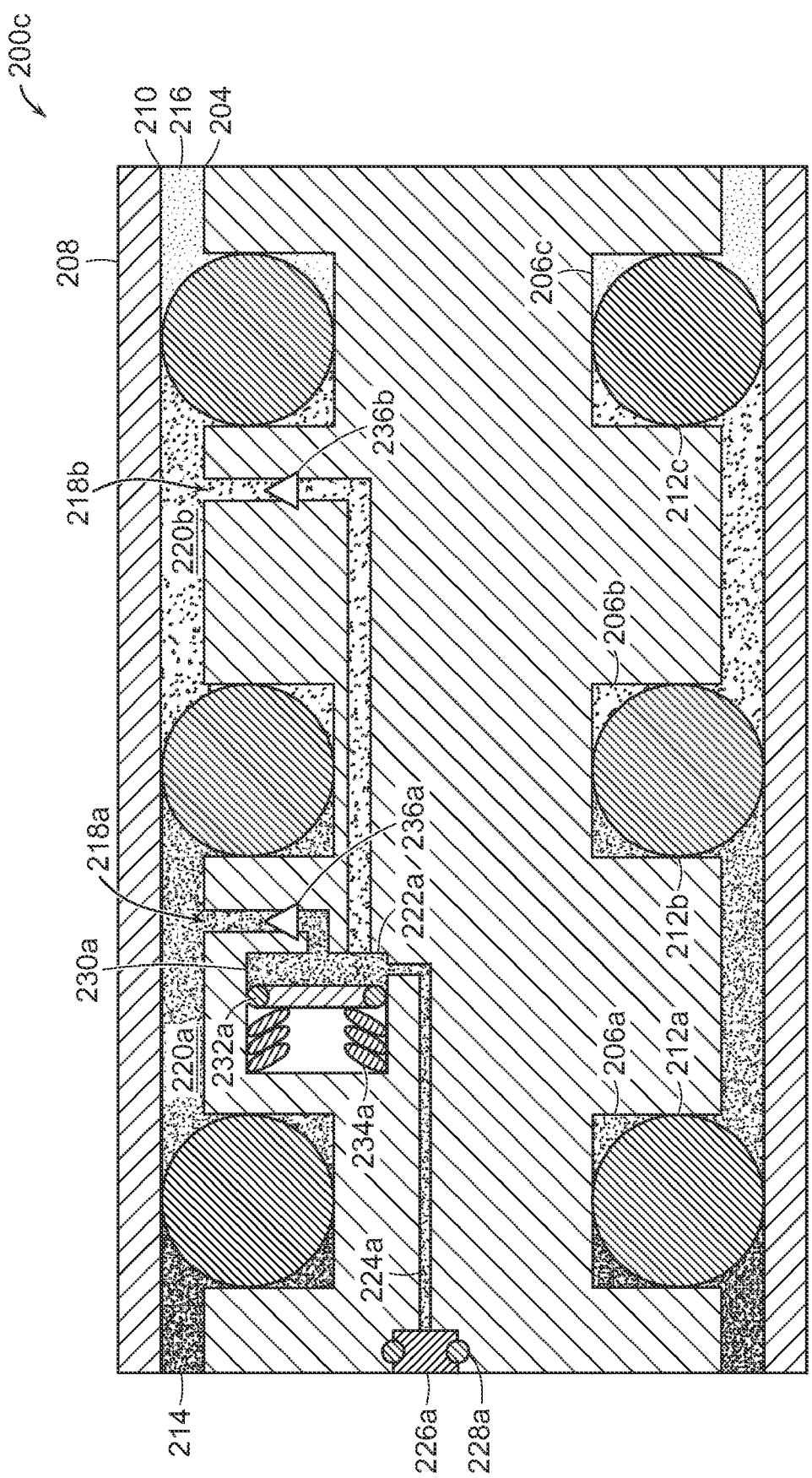
FIG. 2C illustrates a cross-section of a glandular seal with multiple pressure ports and a single pressure reservoir according to one embodiment of the invention.

As depicted in FIG. 2B, each pressure port 218a, 218b can be in communication with a pressure reservoir 222a, 222b. Alternatively, as depicted in FIG. 2C, multiple pressure ports 218a, 218 can be in communication with a single pressure reservoir 222a. The fluid pressure at each intermediate region 220a, 220b can be controlled by pressure regulators 236a, 236b positioned in between pressure reservoirs 222a, 222b and pressure ports 218a, 218b, respectively.

The O-rings 212 incorporated in a particular glandular seal can be uniform in size and material or may be configured for a particular application. For example, if the high pressure fluid 214 is a caustic fluid, a chemical resistant O-ring can be selected for O-ring 212a, while cheaper O-rings can be selected for O-rings 212b (and 212c). Likewise, multiple O-rings 212 can be positioned in a single groove. This embodiment can be particularly advantageous where one of the O-rings is "back-up" designed to prevent extrusion of an O-ring where tight tolerances cannot be achieved between the first sealing surface 204 and the second sealing surface 210. Back-up rings can be constructed from materials with high extrusion resistance such as NBR, nylon, and filled PTFE.

Incorporation by Reference

All patents, published patent applications, and other references disclosed herein are hereby expressly incorporated by reference in their entireties by reference.

Equivalents

Those skilled in the art will recognize, or be able to ascertain using no more than routine experimentation, many equivalents of the specific embodiments of the invention described herein. Such equivalents are intended to be encompassed by the following claims.

The invention claimed is:
1. A downhole sealing gland sealing downhole comprising:
a first sealing surface having a first groove and a second groove;
a first O-ring received in the first groove and exposed to a first pressure of a high pressure fluid;

a second O-ring received in the second groove and exposed to a second pressure of a lower pressure fluid relative to the high pressure fluid;

a pressure port located on the first sealing surface between the first groove and the second groove, the pressure port being in communication with an intermediate region between the first O-ring and the second O-ring;

a fluid delivered via the pressure port and disposed in the intermediate region, the fluid being at a fluid pressure intermediate to the first pressure applied to the first O-ring and the second pressure applied to the second O-ring; and a second sealing surface mates with the first sealing surface.

2. The sealing gland of claim 1 further comprising:
the first sealing surface having a third groove;
a third O-ring received in the third groove; and
an additional pressure port located between the second groove and the third groove.

3. The sealing gland of claim 1 further comprising:
a pressure reservoir in communication with the pressure port for holding a pressurized fluid.

4. The sealing gland of claim 3 further comprising:
a fill port coupled with the pressure reservoir for adjusting the volume of the fluid in the pressure reservoir.

5. The sealing gland of claim 3, wherein the pressure reservoir comprises:
a sealing piston; and
a compression member for permitting movement of the sealing piston to maintain a substantially constant fluid pressure in the pressure reservoir.

6. The sealing gland of claim 5, wherein the compression member is a compression spring.

7. The sealing gland of claim 5, wherein the compression member is a Belleville spring.

8. The sealing gland of claim 1, wherein the fluid pressure is liquid pressure.

9. The sealing gland of claim 1, wherein the fluid pressure is gas pressure.

10. The sealing gland of claim 1, wherein the fluid pressure approximates the arithmetic mean of the first pressure applied to the first O-ring and the second pressure applied to the second O-ring.

11. The sealing gland of claim 1, wherein each of the O-rings is subjected to a pressure drop of about 20 ksi.

12. The sealing gland of claim 1, wherein the first O-ring comprises a material selected from the group consisting of: acrylonitrile-butadiene rubber, hydrogenated acrylonitrile-butadiene rubber, fluorocarbon rubber, perfluoroelastomer, ethylene propylene diene rubber, silicone rubber, fluorosilicone rubber, chloroprene rubber, neoprene rubber, polyester urethane, polyether urethane, natural rubber, polyacrylate rubber, ethylene acrylic, styrene-butadiene rubber, ethylene oxide epichlorodrine rubber, chlorosulfonated polyethylene, butadiene rubber, isoprene rubber, and butyl rubber.

13. The sealing gland of claim 1, wherein the second O-ring comprises a material selected from the group consisting of: acrylonitrile-butadiene rubber, hydrogenated acrylonitrile-butadiene rubber, fluorocarbon rubber, perfluoroelastomer, ethylene propylene diene rubber, silicone rubber, fluorosilicone rubber, chloroprene rubber, neoprene rubber, polyester urethane, polyether urethane, natural rubber, polyacrylate rubber, ethylene acrylic, styrene-butadiene rubber, ethylene oxide epichlorodrine rubber, chlorosulfonated polyethylene, butadiene rubber, isoprene rubber, and butyl rubber.

* * * * *